United States Patent

Denz et al.

[11] Patent Number: 5,816,219
[45] Date of Patent: *Oct. 6, 1998

[54] PROCESS FOR CONTROLLING THE WARM-UP IN AN INTERNAL COMBUSTION ENGINE

[75] Inventors: Helmut Denz, Stuttgart; Martin Klenk, Backnang; Werner Herden, Gerlingen; Hubert Bischof, Vaihingen/enz; Albert Gerhard, Tamm; Matthias Kuesell, Kornwestheim, all of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 724,457

[22] Filed: Oct. 1, 1996

[30] Foreign Application Priority Data

Oct. 18, 1995 [DE] Germany .................... 195 38 731.7

[51] Int. Cl.$^6$ ...................................................... F02D 41/00
[52] U.S. Cl. ........................................... 123/424; 123/491
[58] Field of Search .................................. 123/424, 491, 123/494

[56] References Cited

U.S. PATENT DOCUMENTS

| 5,211,150 | 5/1993 | Anzai | 123/480 |
| 5,497,752 | 3/1996 | Sagisaka et al. | 123/491 |
| 5,586,524 | 12/1996 | Nonaka et al. | 123/73 A |

OTHER PUBLICATIONS

"Motortechnische Zeitschrift" 50 (1989) 6, pp. 247–254 (no translation).

Primary Examiner—Henry Yuen
Assistant Examiner—Hieu T. Vo
Attorney, Agent, or Firm—Kenyon & Kenyon

[57] ABSTRACT

Process for controlling the warm-up in an internal combustion engine wherein the combustion chamber pressure is obtained and evaluated, so that, using the evaluation of the combustion chamber pressure signal, the combustion is controlled so that combustion is not completed at the time the exhaust valve opens during warm-up.

11 Claims, 3 Drawing Sheets

PROCESS FOR CONTROLLING THE WARM-UP IN AN INTERNAL COMBUSTION ENGINE

BACKGROUND INFORMATION

It is known from "Motortechnische Zeitschrift" 50 (1989) 6, pp. 247–254, that the operation of internal combustion engines can be controlled to reduce exhaust gas emissions as a result. The exhaust gas emission is especially high in the case of a cold start, since the catalytic converter has not reached its operating temperature. In engines and hot exhaust gas conducting components that have reached their operating temperatures, the heat provided by the engine is sufficient for optimum catalytic converter operation. It is highly desirable to guarantee that the harmful emissions are reduced as much as possible after a cold start and in the warm-up phase. This means that the warm-up phase should be as short as possible. According to the prior art, this is accomplished by making a high amount of heat available after start, in order to warm up the catalytic converter and make it ready for operation as quickly as possible. This can be done, for example, by affecting the ignition. Thus, heating the catalytic converter through a retarded ignition angle resulting in extended combustion and ultimately high exhaust gas temperatures is one method to reach the operating temperature of the catalytic converter in as short a period as possible.

Reduced harmful emissions during cold start can, however, also be achieved through leaner combustion combined with ignition advance. In the prior art, the optimum ignition angle is calculated and, when the heat penetration phase is reached, when the catalytic converter is warmed through so that the Nox emissions are reduced 90%, a new ignition angle is determined by the control device based on the operating parameters.

SUMMARY OF THE INVENTION

The process according to the present invention has the advantage that, through pressure sensing and evaluation in the combustion chamber, the control device has the information of whether or not the combustion was completed when the exhaust valve opened. Thus the ignition and/or injection can be precisely affected in order to achieve, for example, extended combustion for quickly heating the catalytic converter or very lean combustion to hold raw emissions (HC) low; when lean combustion is desired, it must be ensured that the combustion is 100% completed when the exhaust valve opens.

To evaluate the pressure in the combustion chamber at the time the exhaust valve opens, the combustion chamber pressure signals generated before and after the opening of the exhaust valve can be compared. For this purpose, the variation of the pressure over time t or over crankshaft angle KW is measured and stored in a storage device, so that the combustion chamber pressure signals generated symmetrically before and after the opening of the exhaust valve can be compared. Another option for comparing the pressure signals is by measuring the pressure in the combustion chamber at a certain crankshaft angle before the top dead center, corresponding to the same piston position in the cylinder as that at the crankshaft angle when the exhaust valve opens. The combustion chamber pressure signal is then evaluated in the control device by forming the difference or quotient in a simple manner.

DETAILED DESCRIPTION

Figure 1:
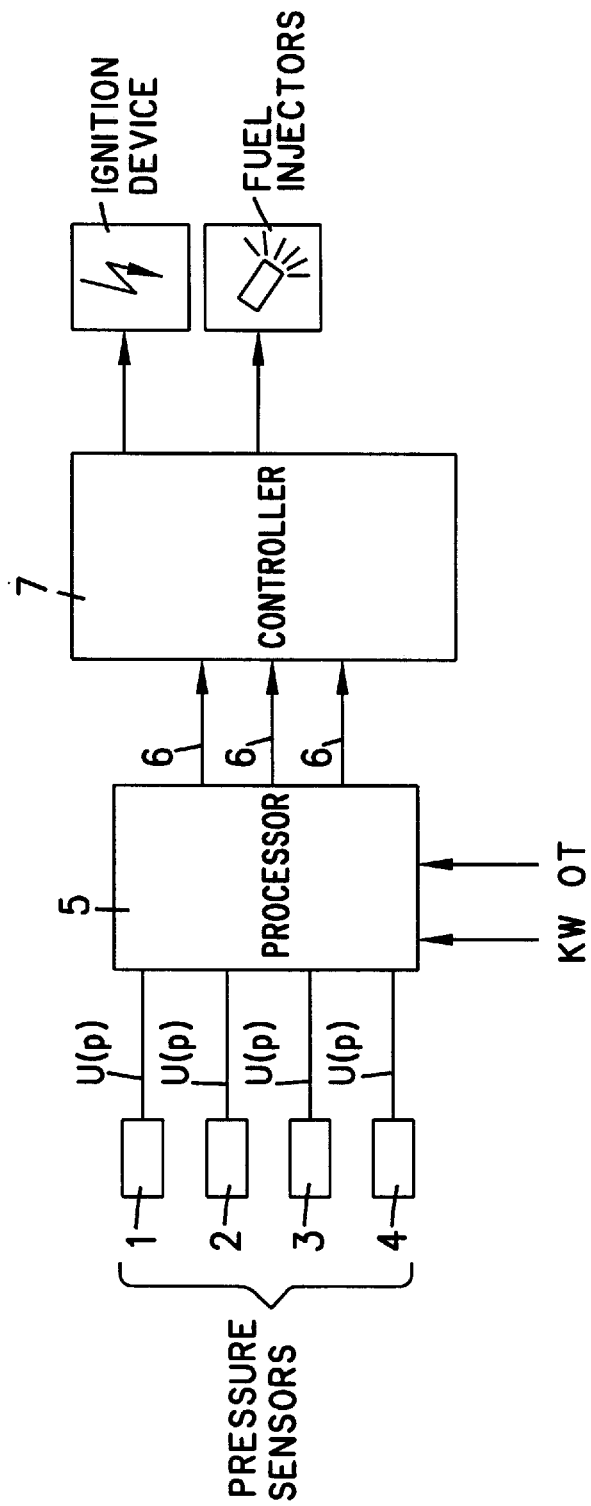
FIG. 1 shows the schematic diagram of an internal combustion engine for carrying out the process according to the present invention.

FIG. 1 shows a device where four combustion chamber sensors 1 through 4, sensing the combustion chamber pressure in the individual cylinders (not shown), are provided. Signal $u_p$, representing the combustion chamber pressure, is sent to analyzer (processor) 5, which also receives a crankshaft angle signal KW. The combustion in the individual cylinders is evaluated in analyzer (processor) 5; analyzer (processor) 5 determines, on the basis of the combustion chamber pressure at the time when the exhaust valve opens, to what degree the combustion has been completed at that time. On the basis of the result of this analysis, analyzer 5 sends manipulated variables 6 to control device (controller) 7, which controls the ignition and injection for the internal combustion engine.

Figure 2:
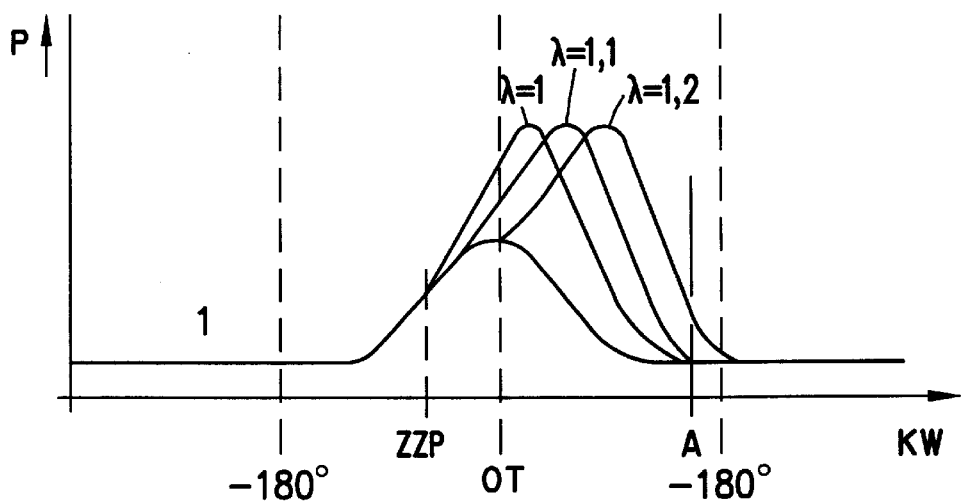
FIG. 2 shows a diagram of the pressure variation with lean combustion.

FIG. 2 shows a diagram of different pressure variation patterns with the pressure plotted against the crankshaft angle. Curve 1 represents the pressure variation in the cylinder without combustion. It can be seen that the pressure increases as the piston moves toward the top dead center TO and then decreases again. The other three curves $\lambda=1$, $\lambda=1.1$, and $\lambda=1.2$ show the combustion process as it takes place when ignition occurs at time ZZP and the combustion is varied only through the injected amount and thus the injection time. Thus, by analyzing the combustion chamber pressure signal, using analyzer a suitable manipulated variable can be determined for the injection valve, which ensures that combustion is completed at the time the exhaust valve opens, denoted with A in the FIG. 2, which is not the case in (as shown in FIG. 2) for $\lambda=1.2$.

Figure 3:
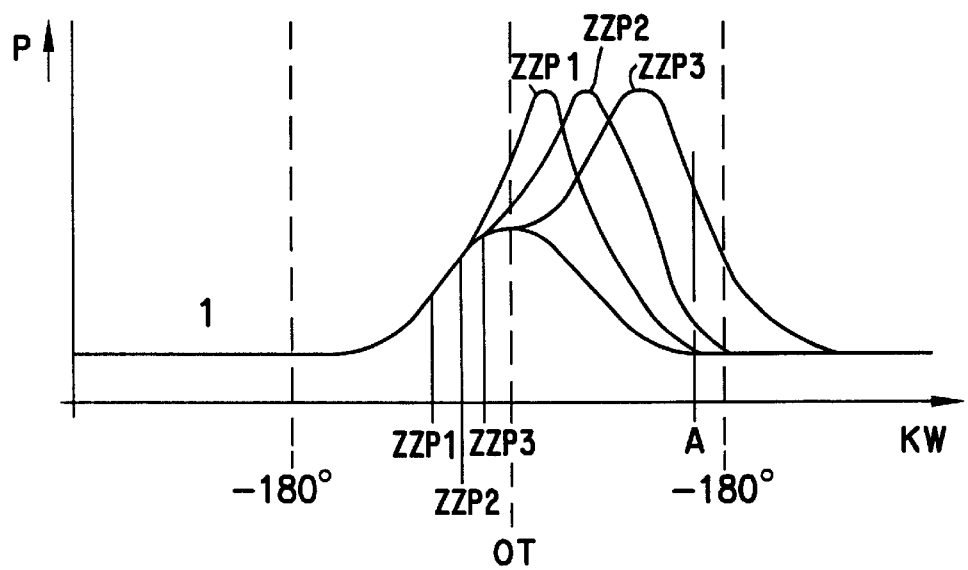
FIG. 3 shows a diagram of the pressure variation with extended combustion.

FIG. 3 also shows the variation of the combustion chamber pressure sensor signal during combustion in which the amount of fuel injected is held constant, and the time of ignition is varied. As in the previous case pressure is plotted against the crankshaft angle, and curve 1 shows the variation of pressure in the cylinder without combustion. In contrast to FIG. 2, the injection amount is held constant in this case, and the time of ignition is varied. As can be seen in FIG. 3, the pressure curve is shifted depending on the time of ignition so that for a cycle in which the time of ignition occurs at ZZP1, the pressure curve indicates that combustion is completed when the exhaust valve opens (as indicated by point A); whereas when the time of ignition occurs at ZZP3, the pressure curve indicates that combustion is not yet complete when the exhaust valve opens as evidenced by the pressure signal being too high at point A. Thus, by adjusting the time of ignition, the post-reactions in the catalytic converter can be influenced by evaluating the combustion chamber pressure signal, so that the catalytic converter is heated as required.

Figure 4:
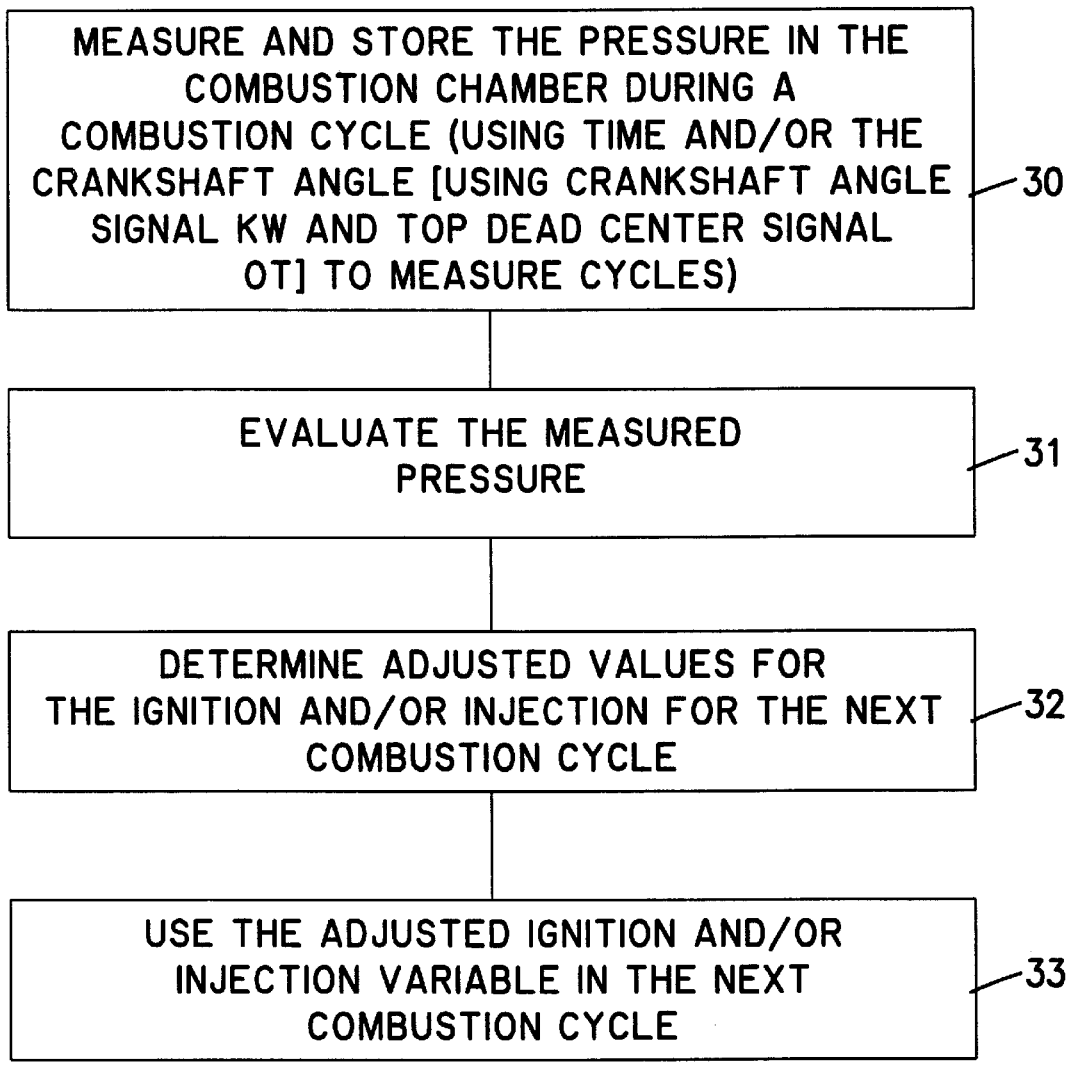
FIG. 4 schematically shows the process.

FIG. 4 schematically shows the process according to the present invention. In a first step 30, the analyzer (processor) obtains a signal KW indicating the crankshaft angle, signal TO indicating the top dead center position of the crankshaft, and the combustion chamber pressure sensor signals over either time t, resulting in p(t), or over the angle of the crankshaft α, resulting in p(α); the pressure sensor signals preferably being stored. In a subsequent step 31, the combustion chamber pressure signals may be evaluated in various ways, either alone or in combination. The first evaluation that may be performed is by forming a difference between the pressure at a period after the opening of the exhaust valve, indicated by either $p(A\ddot{O}+\Delta T)$ or $p(A\ddot{O}+\Delta\alpha)$, and the pressure at a period before the opening of the exhaust valve, indicated by either $p(A\ddot{O}-\Delta t)$ or $p(A\ddot{O}-\Delta\alpha)$. The second evaluation that may be performed is by forming a difference between the pressure immediately after the opening of the exhaust valve, indicated by $p(+A\ddot{O})$, and the pressure immediately before the opening of the exhaust valve, indicated by $p(-A\ddot{O})$. A third evaluation that may be performed is by forming a difference between the integrals of the pressure signals before the opening of the exhaust valve and after the opening of the exhaust valve. These two integrals can be expressed by the following two equations:

$$\int_{OT}^{A\ddot{O}} (p(\alpha) - p(-\alpha))d\alpha$$

and $$\int_{A\ddot{O}}^{OT} (p(\alpha) - p(-\alpha))d\alpha$$

respectively. Of course, the evaluation of the combustion chamber pressure can also be performed by forming a quotient between the various pressures instead of a difference.

Then in subsequent step 32, the difference and/or the quotient is analyzed to determine adjusted values for the ignition period, the injection amount, and/or the injection period in the subsequent combustion cycle so that combustion will be completed by the time the exhaust valve is opened, and the adjusted values are then provided to the ignition and injection controller of the internal combustion engine. Then in further step 33, the controller uses these adjusted values in the subsequent combustion cycle. In fact, the controlled variables are determined as a function of the evaluation of the combustion chamber pressure (which is used to determine whether a combustion had been completed at the time of opening of the exhaust valve). In step 24, the warm-up of the internal combustion engine is controlled using the controlled variables.

The analysis of the pressure in the combustion chamber at the time the exhaust valve opens allows the combustion process to be evaluated, so that extended combustion is achieved in the desired manner by affecting the ignition through shifting the ignition time ZZP. By influencing the injection the combustion rate is modified, so that post-reactions can be produced in the exhaust system by controlling the injection time in order to warm up the catalytic converter. These intentional post-reactions in the exhaust system can then be gradually reduced as the catalytic converter warms up.

What is claimed is:

1. A process for controlling a warm-up in an internal combustion engine, the internal combustion engine including at least one cylinder having a combustion chamber and an exhaust valve, by adjusting at least one of an ignition period, an injection period and an injection amount, comprising the steps of:

determining a pressure in the combustion chamber at a time of opening of the exhaust valve during a first combustion cycle;

evaluating the pressure in the combustion chamber to determine whether complete combustion had occurred at the time of opening of the exhaust valve;

determining at least one adjusted value for the corresponding at least one of the ignition period, the injection period and the injection amount for a subsequent combustion cycle as a function of the evaluation of the pressure in the combustion chamber; and adjusting at least one of the ignition period, the injection period and the injection amount in the combustion chamber in a subsequent combustion cycle as a function of the at least one adjusted value.

2. The process according to claim 1, wherein the step of determining the pressure in the combustion chamber includes the steps of:

determining and temporarily storing a pressure variation between a first pressure before the time of opening of the exhaust valve and a second pressure after the time of opening of the exhaust valve; and comparing the first pressure to the second pressure.

3. The process according to claim 1, wherein the step of evaluating the pressure in the combustion chamber includes the steps of:

forming a first integral of the combustion chamber pressure over a crankshaft angle from a top dead center to the valve opening as expressed by the following:

$$\int_{OT}^{A\ddot{O}} (p(\alpha) - p(-\alpha))d\alpha$$

and a second integral of the combustion chamber pressure from the valve opening to a bottom dead center as expressed by the following:

$$\int_{A\ddot{O}}^{OT} (p(\alpha) - p(-\alpha))d\alpha$$

comparing the first integral to the second intergral.

comparing the first integral to the second integral.

4. The process according to claim 2, wherein the comparing step includes the step of determining a difference between the first pressure and the second pressure.

5. The process according to claim 2, wherein the comparing step includes the step of determining a difference between an integral of the first pressure and an integral of the second pressure.

6. The process according to claim 2, wherein the comparing step includes the step of determining a quotient of the first pressure and the second pressure.

7. The process according to claim 2, wherein the comparing step includes the step of determining a quotient of an integral of the first pressure and an integral of the second pressure.

8. The process according to claim 4, wherein the combustion is evaluated as not yet completed at the time of valve opening if the difference exceeds a preselected value.

9. The process according to claim 5, wherein the combustion is evaluated as not yet completed at the time of valve opening if the difference exceeds a preselected value.

10. The process according to claim 6, wherein the combustion is evaluated as not yet completed at the time of valve opening if the quotient exceeds a preselected value.

11. The process according to claim 7, wherein the combustion is evaluated as not yet completed at the time of valve opening if the quotient exceeds a preselected value.

* * * * *

UNITED STATES PATENT AND TRADEMARK OFFICE
CERTIFICATE OF CORRECTION

PATENT NO. : 5,816,219
DATED       : Oct. 6, 1998
INVENTOR(S) : Denz, Helmut; Klenk, Martin; Herden, Werner; Bischof, Hubert Gerhard, Albert; Kuesell, Matthias It is certified that error appears in the above-identified patent and that said Letters Patent is hereby corrected as shown below:

Column 2, line 33, after "analyzer" insert --5--;

Column 2, line 37, after "case" delete "in"; and

Column 2, line 61, change "TO" to --OT--.

Signed and Sealed this

Third Day of August, 1999

Attest:

Q. TODD DICKINSON

Attesting Officer

Acting Commissioner of Patents and Trademarks